United States Patent
Ochiai

(10) Patent No.: US 10,719,778 B2
(45) Date of Patent: Jul. 21, 2020

(54) ANOMALY DETECTION BASED ON RELATIONAL EXPRESSION BETWEEN VIBRATION STRENGTHS AT VARIOUS FREQUENCIES

(71) Applicant: NEC Corporation, Minato-ku, Tokyo (JP)

(72) Inventor: Katsuhiro Ochiai, Tokyo (JP)

(73) Assignee: NEC CORPORATION, Tokyo (JP)

(*) Notice: Subject to any disclaimer, the term of this patent is extended or adjusted under 35 U.S.C. 154(b) by 777 days.

(21) Appl. No.: 15/306,173

(22) PCT Filed: May 11, 2015

(86) PCT No.: PCT/JP2015/002373
§ 371 (c)(1),
(2) Date: Oct. 24, 2016

(87) PCT Pub. No.: WO2015/174067
PCT Pub. Date: Nov. 19, 2015

(65) Prior Publication Data
US 2017/0046628 A1 Feb. 16, 2017

(30) Foreign Application Priority Data
May 14, 2014 (JP) .................. 2014-100061

(51) Int. Cl.
| | |
|---|---|
| *G06N 20/00* | (2019.01) |
| *E02D 17/20* | (2006.01) |
| *G08B 21/10* | (2006.01) |
| *G08B 31/00* | (2006.01) |
| *G08B 25/08* | (2006.01) |
| *G01V 1/00* | (2006.01) |
| *G01V 9/00* | (2006.01) |
| *G01V 9/02* | (2006.01) |
| *G01H 1/00* | (2006.01) |

(52) U.S. Cl.
CPC .............. *G06N 20/00* (2019.01); *E02D 17/20* (2013.01); *G01H 1/00* (2013.01); *G01V 1/00* (2013.01);

(Continued)

(58) Field of Classification Search
CPC .... G06N 20/00; E02D 17/20; E02D 2600/10; G01H 1/00; G01V 1/00; G01V 1/008;
(Continued)

(56) References Cited

U.S. PATENT DOCUMENTS 9,322,952 B2 * 4/2016 Niemann ................ G01W 1/14
2007/0118333 A1 5/2007 Miyasaka et al.

FOREIGN PATENT DOCUMENTS

| JP | H08-068672 A | 3/1996 |
|---|---|---|
| JP | H09-274023 | * 10/1997 |

(Continued)

OTHER PUBLICATIONS

Liang, "Ground vibrations detection with fiber optic sensor", Optics Communications vol. 285, Issue 9, May 1, 2012, pp. 2363-2367 (Year: 2012).*

(Continued)

*Primary Examiner* — Lut Wong

(57) ABSTRACT

A model learning unit of an anomaly detection device learns a relational expression between vibration strengths at frequencies based on a time series of frequency characteristics of a vibration strength detected during a learning period by a vibration sensor placed on a monitoring target. The anomaly detection unit learns a relational expression between vibration strengths at frequencies based on a time series of frequency characteristics of a vibration strength detected during a new period by the vibration sensor. Then, the anomaly detection unit determines whether or not there is an anomaly in the monitoring target based on a relational expression related to a new frequency, which is different from the relational expression learned during the learning period.

8 Claims, 5 Drawing Sheets

(52) U.S. Cl.
CPC ............. *G01V 1/008* (2013.01); *G01V 9/00* (2013.01); *G01V 9/02* (2013.01); *G08B 21/10* (2013.01); *G08B 25/08* (2013.01); *G08B 31/00* (2013.01); *E02D 2600/10* (2013.01); *Y02A 90/36* (2018.01)

(58) Field of Classification Search
CPC . G01V 9/00; G01V 9/02; G08B 21/10; G08B 25/08; G08B 31/00; Y02A 90/36
USPC .......................................................... 706/12
See application file for complete search history.

(56) References Cited

FOREIGN PATENT DOCUMENTS

| JP | H09-274023 A | 10/1997 |
|---|---|---|
| JP | 2002-140090 A | 5/2002 |
| JP | 2003-232043 A | 8/2003 |
| JP | 2004-257836 | * 9/2004 |
| JP | 2004-257836 A | 9/2004 |
| JP | 2005-030843 A | 2/2005 |
| JP | 2005-345116 A | 12/2005 |
| JP | 2013-096943 | * 5/2013 |
| JP | 2013-096943 A | 5/2013 |

OTHER PUBLICATIONS

International Search Report for PCT Application No. PCT/JP2015/002373, dated Aug. 4, 2015.
English translation of Written opinion for PCT Application No. PCT/JP2015/002373.
Pietro Aleotti et al, "A warning system for rainfall-induced shallow failures", Engineering Geology, vol. 73, Jun. 1, 2004, pp. 247-265, Elsevier B.V. Amsterdam, NL.
Extended European Search Report for EP Application No. EP15792359.0 dated Dec. 19, 2017.

* cited by examiner

ANOMALY DETECTION BASED ON RELATIONAL EXPRESSION BETWEEN VIBRATION STRENGTHS AT VARIOUS FREQUENCIES

This application is a National Stage Entry of PCT/JP2015/002373 filed on May 11, 2015, which claims priority from Japanese Patent Application 2014-100061 filed on May 14, 2014, the contents of all of which are incorporated herein by reference, in their entirety.

TECHNICAL FIELD

The present invention relates to an information processing device, an anomaly detection method and a recording medium.

BACKGROUND ART

A soil anomaly detection system for detecting a place where a landslide disaster is likely to be caused is described, for example, in PTL1. The soil anomaly detection system described in PTL1, by use of an optical fiber sensor which is placed in the soil, measures a temperature and a quantity of strain at a position where the optical fiber sensor is placed, and detects an anomaly of the soil on the basis of the measured temperature and the measured quantity of the strain.

As a related art, a method for calculating a degree of collapse risk is disclosed in PTL 2, in which vibration is generated by a vibration generation source, and water content per volume of soil is estimated on the basis of a ratio of a longitudinal wave and a transversal wave of the vibration measured by a vibration sensor.

CITATION LIST

Patent Literature

PTL1

Japanese Patent Application Laid-Open Publication No. 2003-232043

PTL2

Japanese Patent Application Laid-Open Publication No. 2005-030843

SUMMARY OF INVENTION

Technical Problem

In the case of the above-mentioned art described in PTL1, it is necessary to carry out a large-scale construction work such as placement of the optical fiber sensors all over a soil area which is a monitoring target.

An object of the invention is to solve the above-mentioned problem by providing an information processing device, an anomaly detection method and a recording medium which can easily detect a sign of the landslide disaster without carrying out the large scale construction work.

Solution to Problem

An information processing device according to an exemplary aspect of the invention includes: a learning means for learning a relational expression between vibration strengths at different frequencies based on a time series of frequency characteristics of a vibration strength detected during a learning period by a vibration detection means placed on a monitoring target; and an anomaly detection means for learning a relational expression between vibration strengths at different frequencies based on a time series of frequency characteristics of a vibration strength detected during a new period by the vibration detection means, and determining whether or not there is an anomaly in the monitoring target based on a relational expression related to a new frequency, which is different from the relational expression learned during the learning period.

An anomaly detection method according to an exemplary aspect of the invention includes: learning a relational expression between vibration strengths at different frequencies based on a time series of frequency characteristics of a vibration strength detected during a learning period by a vibration detection means placed on a monitoring target; and learning a relational expression between vibration strengths at different frequencies based on a time series of frequency characteristics of a vibration strength detected during a new period by the vibration detection means, and determining whether or not there is an anomaly in the monitoring target based on a relational expression related to a new frequency, which is different from the relational expression learned during the learning period.

A computer readable storage medium according to an exemplary aspect of the invention records thereon a program, causing a computer to perform a method including: learning a relational expression between vibration strengths at different frequencies based on a time series of frequency characteristics of a vibration strength detected during a learning period by a vibration detection means placed on a monitoring target; and learning a relational expression between vibration strengths at different frequencies based on a time series of frequency characteristics of a vibration strength detected during a new period by the vibration detection means, and determining whether or not there is an anomaly in the monitoring target based on a relational expression related to a new frequency, which is different from the relational expression learned during the learning period.

Advantageous Effects of Invention

An advantageous effect of the present invention is to be able to detect the sign of the landslide disaster with ease.

DESCRIPTION OF EMBODIMENTS

Firstly, a principle on detection of a sign of the landslide disaster in an exemplary embodiment of the present invention will be described.

Figure 4:
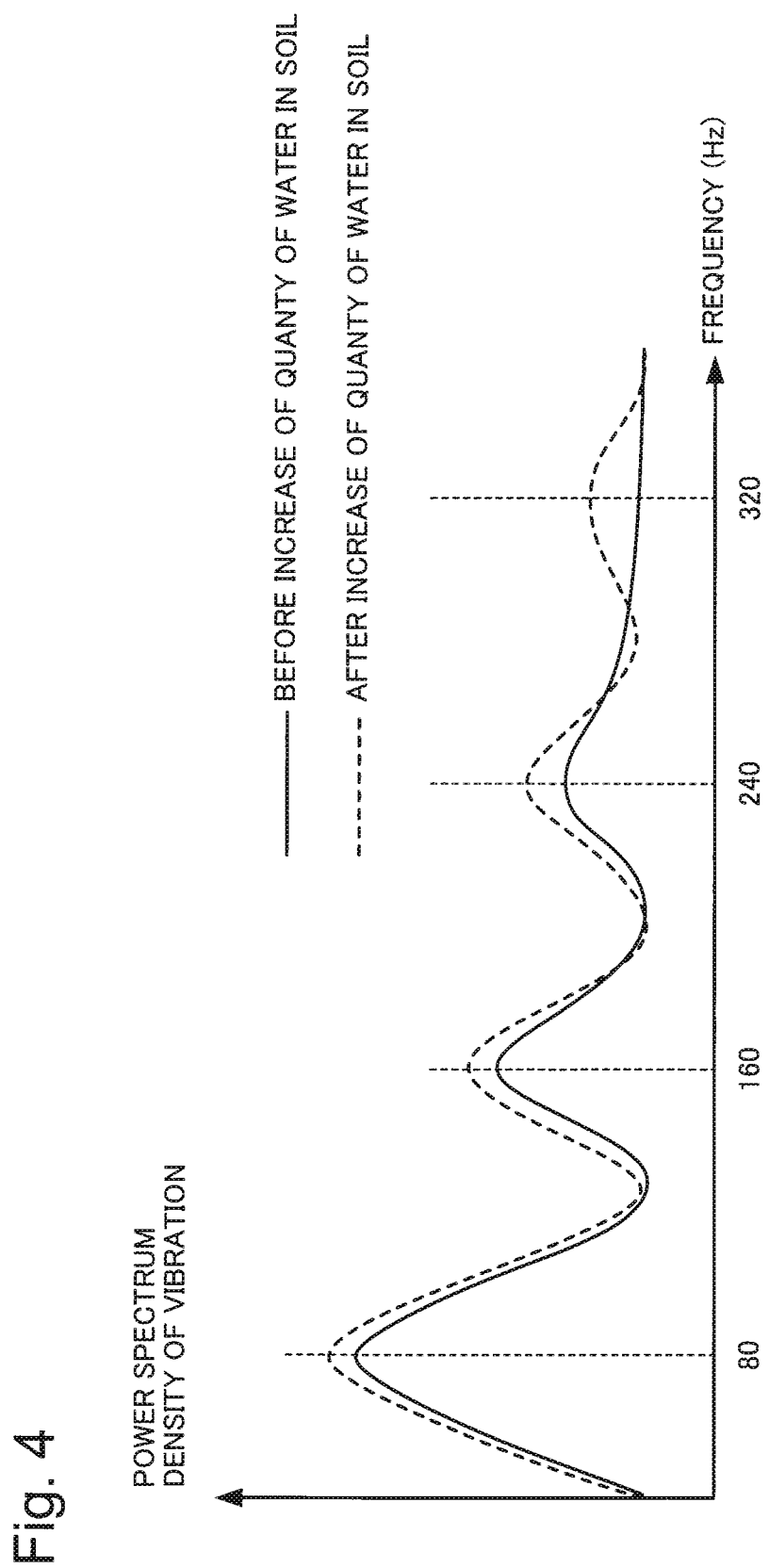
FIG. 4 is a diagram illustrating an example of a frequency characteristic (power spectrum density) of a vibration strength.

FIG. 4 is a diagram illustrating an example of a frequency characteristic (power spectrum density) of a vibration strength in the exemplary embodiment of the present invention.

In FIG. 4, the horizontal axis indicates a frequency of vibration, and the vertical axis indicates the power spectrum density expressing the vibration strength detected by a sensor, which is placed in soil, at a time when a vibration generation device applies the vibration to the soil. In FIG. 4, a solid line indicates the power spectrum density detected before water in the soil increases, and a dotted line indicates the power spectrum density detected after the water in the soil increases.

Generally, when the vibration generation device or the like applies a vibration, a vibration strength detected by the sensor through the soil has peak values at resonance frequencies, and the peak value becomes small as the resonance frequency becomes high. For example, according to the example illustrated in FIG. 4, the power spectrum density (solid line) before water in the soil increases has the peak values at the resonance frequencies 80, 160 and 240 Hz.

Moreover, after the water in the soil increases, since air in the soil is replaced by the water, an attenuation rate of the vibration decreases, and consequently the vibration strength increases. As a result, the vibration strength at the resonance frequency after increase of the water in the soil becomes larger than that before increase of the water in the soil, and furthermore also vibration at a high resonance frequency, which has not been detected before increase of the water in the soil, is detected. For example, according to the example of FIG. 4, the power spectrum density after increase of the water in the soil has the peak values at 320 Hz, in addition to 80, 160 and 240 Hz. Furthermore, in a state that the soil contains more water, vibration at a higher resonance frequency would be detected. That is, by detecting the vibration at a new resonance frequency, it is possible to detect a state that the soil contains more water.

Meanwhile, it is known that one of causes of soil collapse is an increase in a quantity of water in the soil due to rainfalls. Therefore, it is possible to determine whether or not there is a sign of the landslide disaster by detecting that the soil contains more water, on the basis of the vibration at the new resonance frequency as mentioned above.

Here, even if a quantity of water in soil does not increase, there is a possibility that vibration at a new frequency is detected when the vibration generated by the vibration generation source or the like is large. In this case, the vibration at the new frequency caused by the large vibration generated as an accidental noise, for example, may be determined in error as a sign of the landslide disaster. In order to prevent the above-mentioned erroneous determination, a difference in a change of the attenuation rate of the vibration due to the change in a quantity of water between frequencies is used in the exemplary embodiment of the present invention. Specifically, in the exemplary embodiment of the present invention, a relational expression between vibration strengths at different frequencies is learned based on a time series of frequency characteristics of a vibration strength detected during a learning period. In the case that a time series of frequency characteristics of a vibration strength detected during a new period does not satisfy the relational expression (the relational expression is destructed), it is determined that a quantity of water is changed. Then, on the basis of a relational expression related to a new frequency included in relational expressions learned during the new period, it is determined whether or not there is a sign of the landslide disaster.

Next, a configuration of the exemplary embodiment of the present invention will be described.

In the exemplary embodiment of the present invention, a natural escapement or slope formed by soil, or a structure formed by soil, such as an embankment or the like, is used as a monitoring target.

Figure 2:
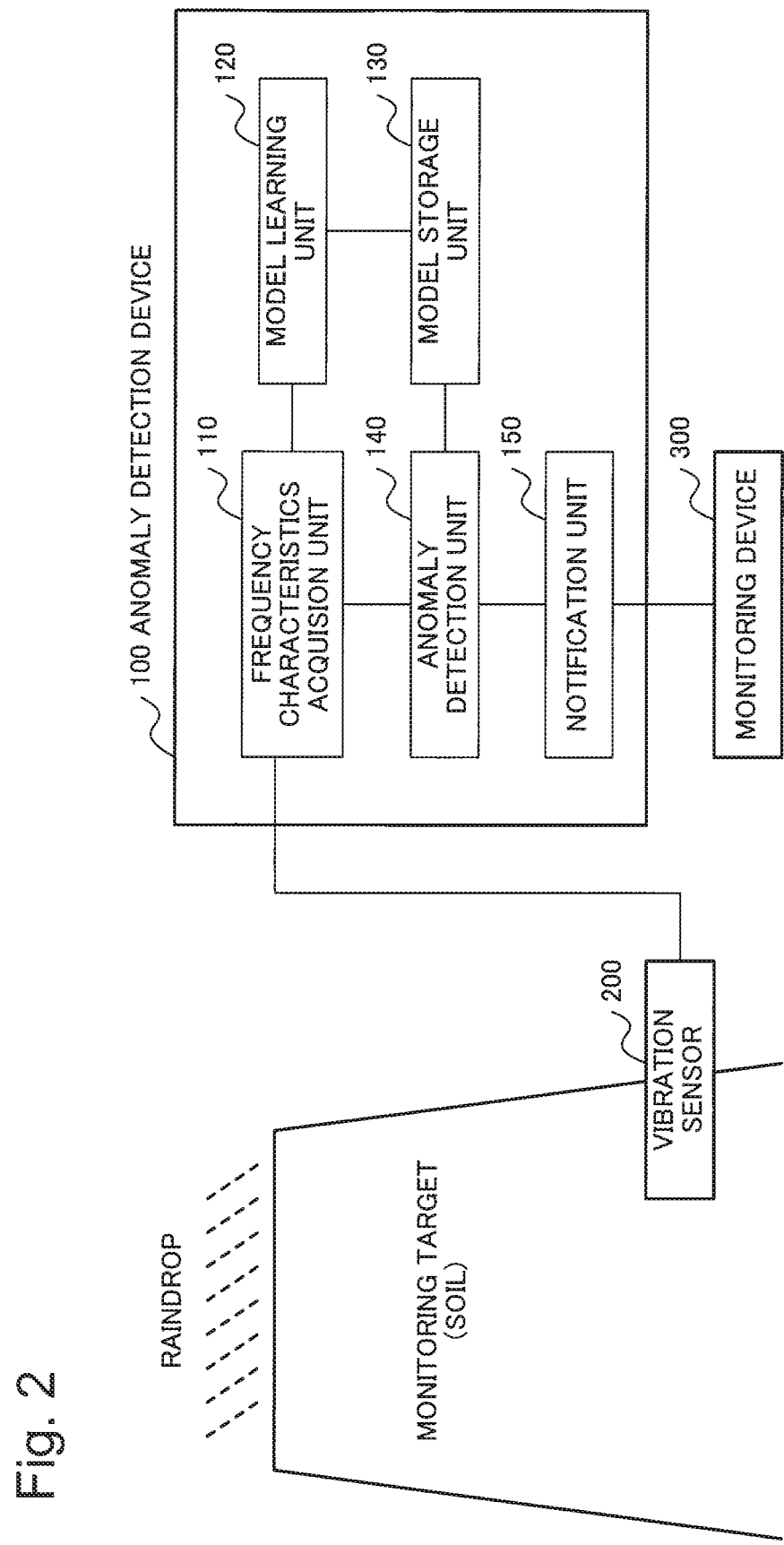
FIG. 2 is a block diagram illustrating a configuration of an anomaly detection device 100 in the exemplary embodiment of the present invention.

FIG. 2 is a block diagram illustrating a configuration of an anomaly detection device 100 in the exemplary embodiment of the present invention. The anomaly detection device 100 is one exemplary embodiment of an information processing device of the present invention.

The anomaly detection device 100 is connected with a vibration sensor (or a vibration detection unit) 200 and a monitoring device 300 through wired or wireless communication channels.

As illustrated in FIG. 2, the vibration sensor 200 is placed at any position of the monitoring target such as a slope or the like of the monitoring target. Here, the monitoring target is, for example, a natural escapement or a structure such as an embankment, formed by soil. The vibration sensor 200 detects vibration generated in the monitoring target by raindrops falling at a position (another position) different from the position where the vibration sensor 200 is placed on the monitoring target, such as an upper position of the monitoring target, or by a vibration device (not illustrated in the drawing) which is placed at another position.

The anomaly detection device 100 detects an anomaly of the soil (sign of landslide disaster) on the basis of the vibration detected by the vibration sensor 200.

The anomaly detection device 100 includes a frequency characteristics acquisition unit 110, a model learning unit (or learning unit) 120, a model storage unit 130, an anomaly detection unit 140 and a notification unit 150.

The frequency characteristics acquisition unit 110 converts vibration detected by the vibration sensor 200, into a frequency characteristic (power spectrum density).

The model learning unit 120 learns a relational expression between vibration strengths at different frequencies on the basis of a time series of the frequency characteristics of the vibration strength detected during a learning period.

The model storage unit 130 stores the relational expression learned by the model learning unit 120.

The anomaly detection unit 140 learns a relational expression between vibration strengths at different frequencies on the basis of a time series of frequency characteristics of a vibration strength detected during a new period. Then, the anomaly detection unit 140 detects the anomaly of the soil by detecting the relational expression related to a new frequency which is different from the relational expression learned in the learning period.

The notification unit 150 notifies the monitoring device 300 of an anomaly (anomaly alert) of the soil.

The monitoring device 300 outputs the anomaly (anomaly alert) of the soil received from the anomaly detection device 100, to a user or the like.

Here, while one vibration sensor 200 is illustrated in FIG. 2, the number of the vibration sensors 200 may be any number of one or more. Moreover, the monitoring device 300 may be included in the anomaly detection device 100. The components of the anomaly detection device 100 may be connected each other through a network or the like.

Note that the anomaly detection device 100 may be a computer which includes CPU (Central Processing Unit) and a storage medium storing a program, and operates according to control based on the program.

Figure 3:
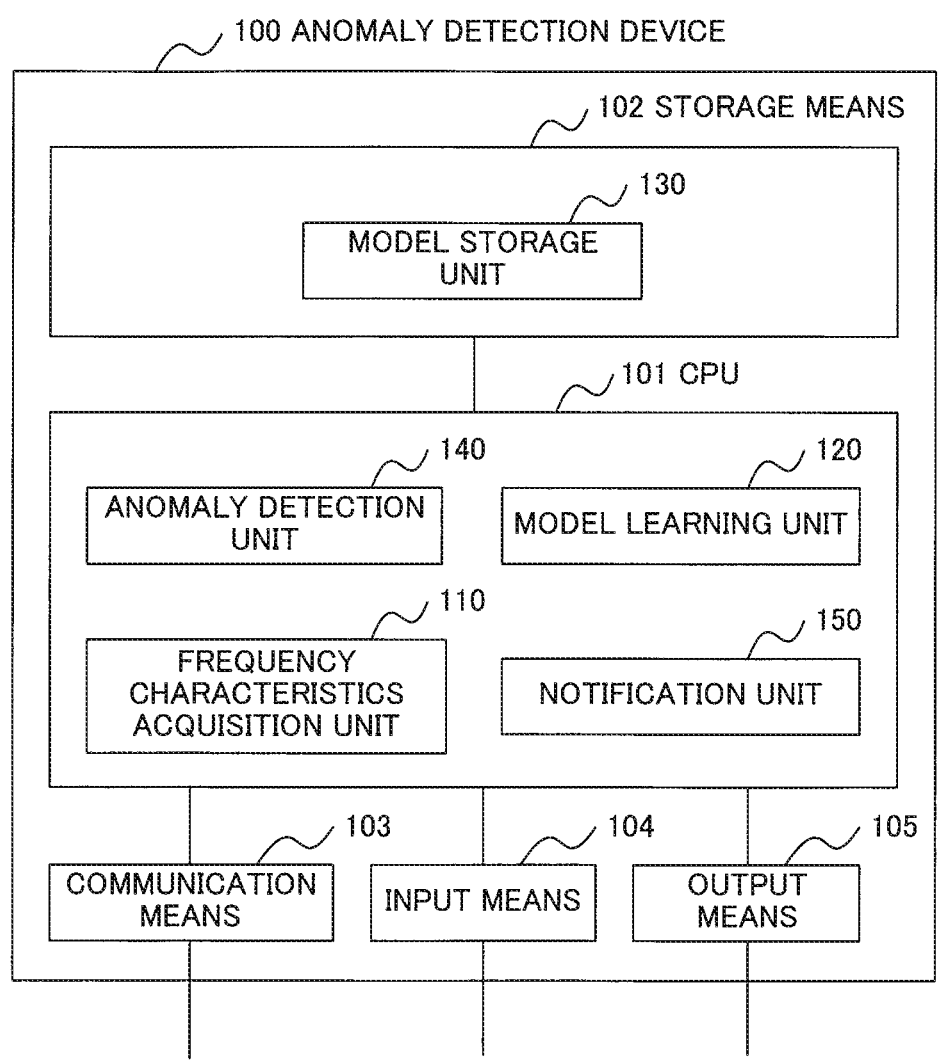
FIG. 3 is a block diagram illustrating a configuration of the anomaly detection device 100, which is realized by a computer, in the exemplary embodiment of the present invention.

FIG. 3 is a block diagram illustrating a configuration of the anomaly detection device 100, which is realized by the computer, in the exemplary embodiment of the present invention. The anomaly detection device 100 includes CPU 101, a storage means (storage medium) 102 such as a hard disc, a memory or the like, a communication means 103 which carries out data communication with another device or the like, an input means 104 such as a keyboard or the like, and an output means such as a display or the like.

The CPU 101 executes a computer program for realizing functions of the frequency characteristics acquisition unit 110, the model learning unit 120, the anomaly detection unit 140 and the notification unit 150. The storage means 102 stores data of the model storage unit 130. The communication means 103 receives a detection result of vibration from the vibration sensor 200. The communication means 103 also sends an anomaly alert to the monitoring device 300. The input means 104 receives setting parameters such as various threshold values and the like from a user or the like. The output means 105 may output the anomaly alert to the user or the like.

Also, each component of the anomaly detection device 100 illustrated in FIG. 2 may be a logical circuit separated each other.

Next, the operation of the exemplary embodiment of the present invention will be described.

Figure 5:
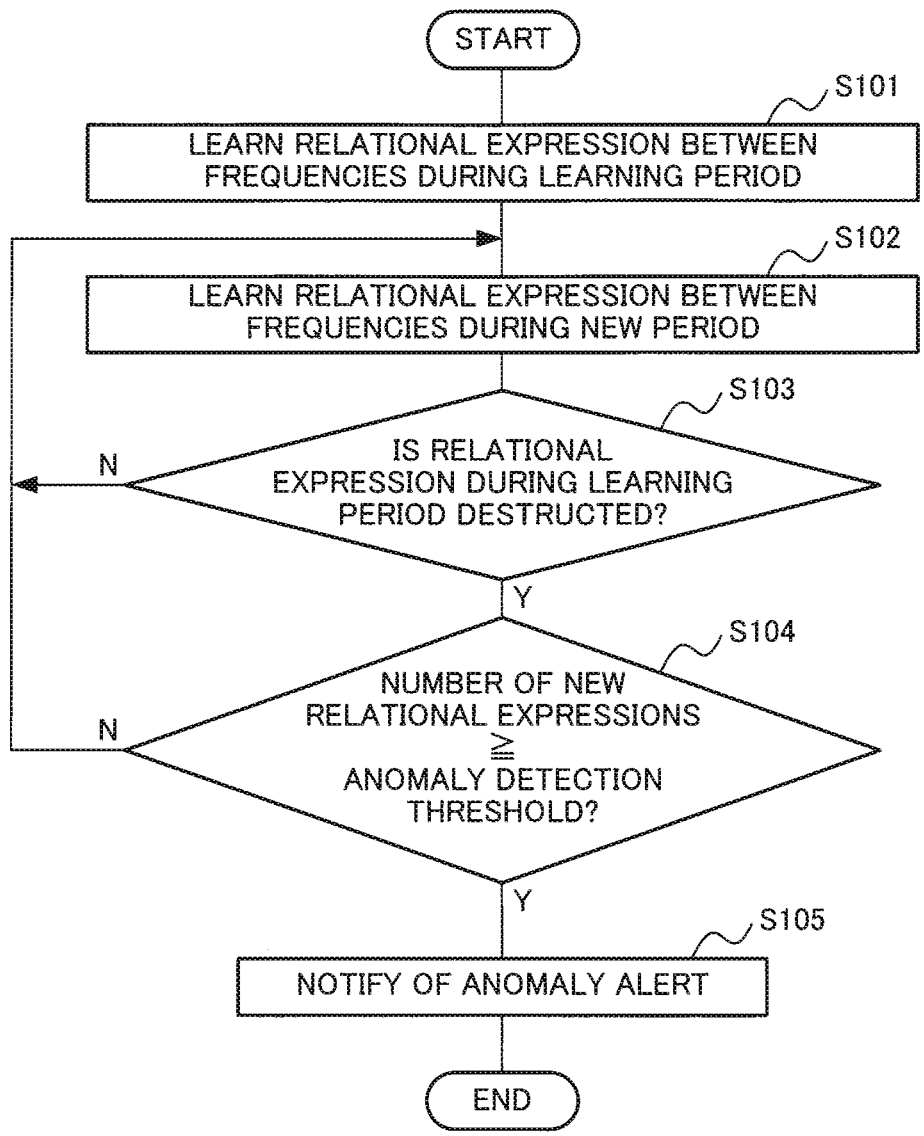
FIG. 5 is a flowchart illustrating operation of the anomaly detection device 100 in the exemplary embodiment of the present invention.

FIG. 5 is a flowchart illustrating the operation of the anomaly detection device 100 in the exemplary embodiment of the present invention.

Firstly, the model learning unit 120 of the anomaly detection device 100 learns a relational expression between vibration strengths at different frequencies on the basis of a time series of power spectrum density (frequency characteristic) in a learning period, which is acquired by the frequency characteristics acquisition unit 110 (Step S101).

Here, the learning period is a period during which soil is vibrated by raindrops just after starting to rain, for example. In the case that there is a vibration generation source other than the raindrops, the learning period is a period during which the soil is vibrated by the vibration generation source.

The relational expression is a mathematical relation which is valid between time series data of power spectrum density at a certain frequency and time series data of power spectrum density at another frequency, when vibration is applied.

For example, the model learning unit 120 learns a relational expression of Math. 1 by the regression analysis method.

$$Fy(t)=a \times Fx(t) \qquad \text{[Math. 1]}$$

Here, "Fy (t)" and "Fx (t)" denote power spectrum densities at frequencies y and x at a time t respectively, and "a" denotes a parameter (coefficient).

Note that any relational expression, for example, the ARX (Auto Regressive eXogenous) model or the like, may be used as long as the relational expression represents a relation between vibration strengths at different frequencies on the basis of time series data of power spectrum density. Moreover, the relational expression may include power spectrum density in the past time such as Fx (t−1), Fx (t−2), . . . , or the like. The relational expression is not limited to a linear equation. The relational expression may include a multidimensional mathematical expression or logarithm. The relational expression may be a polynomial equation. The relational expression may be a mathematical expression obtained by combining the above.

The model learning unit 120 calculates the parameter of the relational expression by use of the time series of the power spectrum density detected during the learning period. Then, the model learning unit 120 calculates a prediction error of the relational expression by applying the time series of the power spectrum density, which is detected during the learning period, to the relational expression in which the calculated parameter is used. If the calculated prediction error is less than a predetermined threshold value (learning threshold value), the model learning unit 120 determines the relational expression as a relational expression of the learning result.

Here, as a frequency for learning, a resonance frequency in the power spectrum density is used, for example. In this case, the model learning unit 120 learns a relational expression between a first-order resonance frequency and another resonance frequency, for example.

For example, the model learning unit 120 learns relational expressions of Math. 2, for frequencies 80 Hz and 160 Hz, and frequencies 80 Hz and 240 Hz, on the power spectrum density represented by the solid line in FIG. 4.

$$F80(t)=1.5 \times F160(t)$$

$$F80(t)=2.4 \times F240(t) \qquad \text{[Math. 2]}$$

Note that, as the frequency for learning, a frequency other than the resonance frequency, for example, a frequency near to the resonance frequency or the like, may be used, as long as the vibration is observed for the frequency other than the resonance frequency.

Moreover, the model learning unit 120 may learn a relational expression between a relatively higher frequency (240 Hz in FIG. 4) and a relatively lower frequency (80 Hz in FIG. 4) out of the detected resonance frequencies.

The model learning unit 120 makes the model storage unit 130 store the relational expression acquired through learning, as a relational expression of the leaning period.

For example, the model learning unit 120 makes the model storage unit 130 store the relational expressions of Math. 2.

Then, the anomaly detection unit 140 learns a relational expression between frequencies on the basis of time series of power spectrum density in a new period, which is acquired by the frequency characteristics acquisition unit 110 (Step S102).

Here, the new learning period is a period during which the soil is vibrated by raindrops after the learning period, for example. In the case that there is the vibration generation source other than the raindrops, the learning period is a period during which the soil is vibrated by the vibration generation source after the learning period, for example.

The anomaly detection unit 140 learns the relational expression similarly to the above-mentioned Step S101.

For example, the anomaly detection unit 140 learns relational expressions of Math. 3, for frequencies 80 Hz and 320 Hz, in addition to frequencies 80 Hz and 160 Hz and frequencies 80 Hz and 240 Hz, on the power spectrum density represented by the dotted line in FIG. 4.

$$F80(t)=1.6 \times F160(t)$$

$$F80(t)=2.0 \times F240(t)$$

$$F80(t)=3.0 \times F320(t) \qquad \text{[Math. 3]}$$

The anomaly detection unit 140 determines whether or not a relation described by the relational expression of the learning period stored in the model storage unit 130 is destructed (whether or not a quantity of water is changed) (Step S103).

Here, the anomaly detection unit 140 calculates, by applying the time series of the power spectrum density in the new period to the relational expression stored in the model storage unit 130, a prediction error of the relational expression. If the calculated prediction error is equal to or larger than the prediction error at a time of learning, the anomaly detection unit 140 determines that the relation is destructed.

In the case that the relation is not destructed in Step S103 (Step S103/N), the processes from Step S102 to Step S103 are carried out repeatedly.

In the case that the relation is destructed in Step S103 (Step S103/Y), the anomaly detection unit 140 calculates the number of the relational expressions (new relational expressions) related to new frequencies, which are different from the relational expressions of the learning period, out of the relational expressions learned in Step S102. Then, the anomaly detection unit 140 determines whether the number of the new relational expressions is equal to or larger than a predetermined threshold value (threshold value for detection of anomaly) (Step S104).

In the case that the number of the new relational expressions is smaller than the threshold value in Step S104 (Step S104/N), the processes from Step S102 to Step S104 are carried out repeatedly.

In the case that the number of the new relational expressions is equal to or larger than the threshold value in Step S104 (Step S104/Y), the anomaly detection unit 140 notifies the monitoring device 300 of an anomaly (anomaly alert) of the soil through the notification unit 150 (Step S105).

For example, the anomaly detection unit 140 determines that the relations represented by the relational expressions of Math. 2 are destructed. Then, the anomaly detection unit 140 calculates the number of the new relational expressions (relation expression between frequencies 80 Hz and 320 Hz) as "1". Here, in the case that the threshold value for detection of anomaly is "1", the anomaly detection unit 140 carries out notification of the anomaly alert.

Note that, in Step S104, the anomaly detection unit 140 may calculate only the number of the new relational expressions (in the above-mentioned example, the relational expression between the frequencies 80 Hz and 320 Hz) related to the frequencies which are higher than the frequencies related to the relational expressions of the learning period.

Moreover, the processes from Step S102 to Step S104 may be carried out even after the notification of the anomaly alert in Step S105.

By carrying out the above, the operation of the exemplary embodiment of the present invention is completed.

While power spectrum density is used as a frequency characteristic of a vibration strength in the exemplary embodiment of the present invention, a spectrum of the vibration strength at each frequency may be used in place of the power spectrum density.

Moreover, in order to improve performance in detecting the anomaly, frequency bands each having a certain frequency range may be defined, and a relational expression between the frequency bands may be learned and destruction of the relational expression may be detected.

Figure 1:
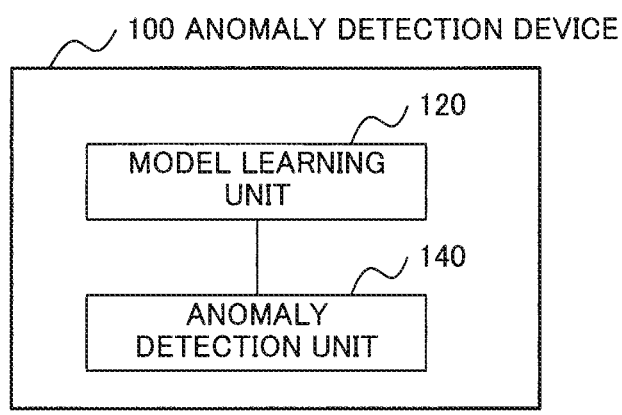
FIG. 1 is a block diagram illustrating a characteristic configuration of an exemplary embodiment of the present invention.

Next, a characteristic configuration of the exemplary embodiment of the present invention will be described. FIG. 1 is a block diagram illustrating a characteristic configuration of the exemplary embodiment of the present invention.

Referring to FIG. 1, an anomaly detection device 100 includes a model learning unit (or learning unit) 120 and an anomaly detection unit 140.

The model learning unit 120 learns a relational expression between vibration strengths at different frequencies based on a time series of frequency characteristics of a vibration strength detected during a learning period by a vibration sensor (vibration detection unit) placed on a monitoring target.

The anomaly detection unit 140 learns a relational expression between vibration strengths at different frequencies based on a time series of frequency characteristics of a vibration strength detected during a new period by the vibration sensor, and determines whether or not there is an anomaly in the monitoring target based on a relational expression related to a new frequency, which is different from the relational expression learned during the learning period.

According to the exemplary embodiment of the present invention, it is possible to easily detect a sign of landslide disaster. The reason is that the anomaly detection unit 140 learns a relational expression between vibration strengths at different frequencies on the basis of a time series of frequency characteristics of a vibration strength detected during a new period, and determines whether or not there is anomaly in a monitoring target on the basis of a relational expression related to a new frequency, which is different from a relational expression learned during a learning period. Therefore, it is possible to detect the anomaly of the monitoring target without carrying out large-scale construction work such as placement of sensors all over the monitoring target.

Moreover, according to the exemplary embodiment of the present invention, even if a vibration generation source is raindrop or a small size vibration generation source, it is possible to detect the sign of the landslide disaster. The reason is that the anomaly detection unit 140 of the anomaly detection device 100 determines whether or not there is the anomaly in the monitoring target by using vibration which is detected in the case that an attenuation rate is decreased as water of soil is increased.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, while soil is used as a monitoring target in the exemplary embodiment of the present invention, a concrete structure or the like may be used as the monitoring target, as long as a frequency characteristic of a vibration strength is changed due to increase of a quantity of water.

This application is based upon and claims the benefit of priority from Japanese Patent Application No. 2014-100061, filed on May 14, 2014, the disclosure of which is incorporated herein in its entirety by reference.

REFERENCE SIGNS LIST

100 ANOMALY DETECTION DEVICE
101 CPU
102 STORAGE MEANS
103 COMMUNICATION MEANS
104 INPUT MEANS
105 OUTPUT MEANS

110 FREQUENCY CHARACTERISTICS ACQUISITION UNIT
120 MODEL LEARNING UNIT
130 MODEL STORAGE UNIT
140 ANOMALY DETECTION UNIT
150 NOTIFICATION UNIT
200 VIBRATION SENSOR
300 MONITORING DEVICE

What is claimed is:

1. An information processing device comprising:
at least one memory storing instructions; and
at least one processor connected to the memory that, based on the instructions, performs operations comprising:
learning a first relational expression between vibration strengths at various frequencies based on a time series of frequency characteristics of a vibration strength detected during a first period by a vibration detector placed on a monitoring target, the vibration strength detected during a first period being converted using vibration generated by raindrops falling on the monitoring target;
calculating a second relational expression between vibration strengths at frequencies including a frequency which is different from the various frequencies based on a time series of frequency characteristics of a vibration strength detected during a second period by the vibration detector, the vibration strength detected during a second period being converted using vibration generated by raindrops falling on the monitoring target; and
determining whether or not there is an anomaly in the monitoring target based on the second relational expression in a case that the time series data of the frequency characteristics of the vibration strength detected during the second period do not satisfy the first relational expression.

2. The information processing device according to claim 1, the instructions further comprising:
learning the first relational expression between vibration strengths at various resonance frequencies; and
calculating the second relational expression between vibration strengths at resonance frequencies including a resonance frequency which is different from the various resonance frequencies.

3. The information processing device according to claim 1, the instructions further comprising:
calculating a relational expression related to the frequency which is higher than the various frequencies as the second relational expression.

4. The information processing device according to claim 1, the instructions further comprising:
determining that there is an anomaly in the monitoring target in a case that number of the second relational expressions is equal to or larger than a predetermined threshold value.

5. An anomaly detection method comprising:
learning a first relational expression between vibration strengths at various frequencies based on a time series of frequency characteristics of a vibration strength detected during a first period by a vibration detector placed on a monitoring target, the vibration strength detected during a first period being converted using vibration generated by raindrops falling on the monitoring target; and
calculating a second relational expression between vibration strengths at frequencies including a frequency which is different from the various frequencies based on a time series of frequency characteristics of a vibration strength detected during a second period by the vibration detector, the vibration strength detected during a second period being converted using vibration generated by raindrops falling on the monitoring target; and
determining whether or not there is an anomaly in the monitoring target based on the second relational expression in a case that the time series data of the frequency characteristics of the vibration strength detected during the second period do not satisfy the first relational expressional.

6. The anomaly detection method according to claim 5, further comprising:
learning the first relational expression between the vibration strengths at various resonance frequencies; and
calculating the second relational expression between vibration strengths at resonance frequencies including a resonance frequency which is different from the various resonance frequencies.

7. A non-transitory computer readable storage medium recording thereon a program, causing a computer to perform a method comprising:
learning a first relational expression between vibration strengths at various frequencies based on a time series of frequency characteristics of a vibration strength detected during a first period by a vibration detector placed on a monitoring target, the vibration strength detected during a first period being converted using vibration generated by raindrops falling on the monitoring target;
calculating a second relational expression between vibration strengths at frequencies including a frequency which is different from the various frequencies based on a time series of frequency characteristics of a vibration strength detected during a second period by the vibration detector, the vibration strength detected during a second period being converted using vibration generated by raindrops falling on the monitoring target, and
determining whether or not there is an anomaly in the monitoring target based on the second relational expression in a case that the time series data of the frequency characteristics of the vibration strength detected during the second period do not satisfy the first relational expressional.

8. The non-transitory computer readable storage medium recording thereon the program according to claim 7, further comprising:
learning the first relational expression between the vibration strengths at various resonance frequencies; and
calculating the second relational expression between vibration strengths at resonance frequencies including a resonance frequency which is different from the various resonance frequencies.

* * * * *